US 11,022,165 B2

(12) United States Patent
    Preuss

(10) Patent No.: US 11,022,165 B2
(45) Date of Patent:    Jun. 1, 2021

(54) SPACER INSERT

(71) Applicant: Taylor Made Group, LLC, Gloversville, NY (US)

(72) Inventor: Mark Preuss, Angola, IN (US)

(73) Assignee: TAYLOR MADE GROUP, LLC, Gloversville, NY (US)

( * ) Notice: Subject to any disclaimer, the term of this patent is extended or adjusted under 35 U.S.C. 154(b) by 50 days.

(21) Appl. No.: 16/375,104

(22) Filed: Apr. 4, 2019

(65) Prior Publication Data
    US 2019/0309790 A1    Oct. 10, 2019

Related U.S. Application Data

(60) Provisional application No. 62/653,045, filed on Apr. 5, 2018.

(51) Int. Cl.
    *F16B 37/12*    (2006.01)
    *B62D 65/02*    (2006.01)

(52) U.S. Cl.
    CPC ............ *F16B 37/125* (2013.01); *B62D 65/02* (2013.01)

(58) Field of Classification Search
    CPC ...... F16B 37/125; F16B 35/02; F16B 35/005; F16B 5/02; B62D 65/02; B62D 65/06
    See application file for complete search history.

(56) References Cited

U.S. PATENT DOCUMENTS

| 4,657,282 | A | 4/1987 | Koch |
| 4,809,469 | A | 3/1989 | Klein |
| 5,106,225 | A | 4/1992 | Andre et al. |
| 5,584,142 | A | 12/1996 | Spiess |
| 6,071,036 | A | 6/2000 | Ruckert |
| 6,739,813 | B1 * | 5/2004 | Gundy ................... F16B 13/02 411/377 |
| 6,854,213 | B2 | 2/2005 | Galliani |
| 7,877,948 | B2 * | 2/2011 | Davies ................. B65D 90/043 52/506.05 |
| 8,371,783 | B2 | 2/2013 | Diehl et al. |
| 8,484,916 | B2 | 7/2013 | Farag |
| 8,591,158 | B2 | 11/2013 | Diehl et al. |
| 8,800,109 | B1 | 8/2014 | Mitchell et al. |
| 8,910,350 | B2 | 12/2014 | Poulakis |
| 9,089,416 | B2 | 7/2015 | Ammann |
| 9,376,126 | B2 | 6/2016 | Biadatz et al. |
| 9,421,040 | B2 | 8/2016 | Beger et al. |
| 10,022,215 | B2 | 7/2018 | Ammann |
| 10,184,290 | B2 | 1/2019 | Briese et al. |

* cited by examiner

*Primary Examiner* — John C Hong
(74) *Attorney, Agent, or Firm* — Nixon & Vanderhye P.C.

(57) ABSTRACT

A spacer insert for providing spacing between a first structure and a second structure includes a head having a diameter larger than an opening in the first structure to which the spacer insert is attachable, a hollow cylindrical shaft coupled with and extending from the head that defines at least part of a connector channel, and a thread on an exterior of the hollow cylindrical shaft. The spacer insert provides a better thread engagement, is more economical to install, and is more reliable in service.

9 Claims, 2 Drawing Sheets

SPACER INSERT

CROSS-REFERENCES TO RELATED APPLICATIONS

This application claims the benefit of U.S. Provisional Patent Application No. 62/653,045, filed Apr. 5, 2018, the entire content of which is herein incorporated by reference.

STATEMENT REGARDING FEDERALLY SPONSORED RESEARCH OR DEVELOPMENT (NOT APPLICABLE)

BACKGROUND AND SUMMARY

The invention relates to a spacer insert for a reinforced window or door system.

The spacer insert of the described embodiments provides spacing from a frame to a mounting on the cab wall. The spacer insert also provides a better thread engagement for the installer to mount a screw around the perimeter, instead of relying on the frame material, which is typically aluminum.

The spacer insert is similar in function to a helicoil insert, but is designed to be easily inserted with standard tooling and be accurately torqued. The spacer insert may also have a thread locker such as Loctite® or the like added to the outer threads to enable the insert to stay in place and not back out.

The spacer insert is a better alternative to a riv nut, or a riv nut with a washer. It is intended to be more economical to install and more reliable in service.

In an exemplary embodiment, a spacer insert for providing spacing between a first structure and a second structure includes a head having a diameter larger than an opening in the first structure to which the spacer insert is attachable, a hollow cylindrical shaft coupled with and extending from the head that defines at least part of a connector channel, and a thread on an exterior of the hollow cylindrical shaft. The head may include a shaped recess continuous with and forming part of the connector channel. The shaped recess may include a hex recess. In some embodiments, the thread extends to about a mid-portion of the hollow cylindrical shaft. The spacer insert may be 15 mm long, and the thread may extend to a position 7 mm from the head. The thread may be spaced from the head by an undercut, which may be about 0.75 mm. A thread locker may be provided on the thread.

In another exemplary embodiment, a method of securing a first structure to a second structure using the spacer insert of the described embodiments includes the steps of (a) forming openings in the first structure that are sized to receive the hollow cylindrical shaft and the exterior thread; (b) securing the spacer inserts in the openings in the first structure; (c) forming openings in the second structure in locations corresponding to the openings in the first structure; (d) aligning the openings in the second structure with the spacer inserts positioned in the openings of the first structure; and (e) inserting a connector through each of the openings in the second structure and into the spacer inserts, wherein the heads of the spacer inserts are interposed between the second structure and the first structure to define a space between the second structure and the first structure. Step (b) may be practiced by threading the spacer inserts into the openings in the first structure. Step (e) may be practiced by threading the connector into each of the spacer inserts.

BRIEF DESCRIPTION OF THE DRAWINGS

These and other aspects and advantages will be described in detail with reference to the accompanying drawings, in which.

DETAILED DESCRIPTION

Figure 1:
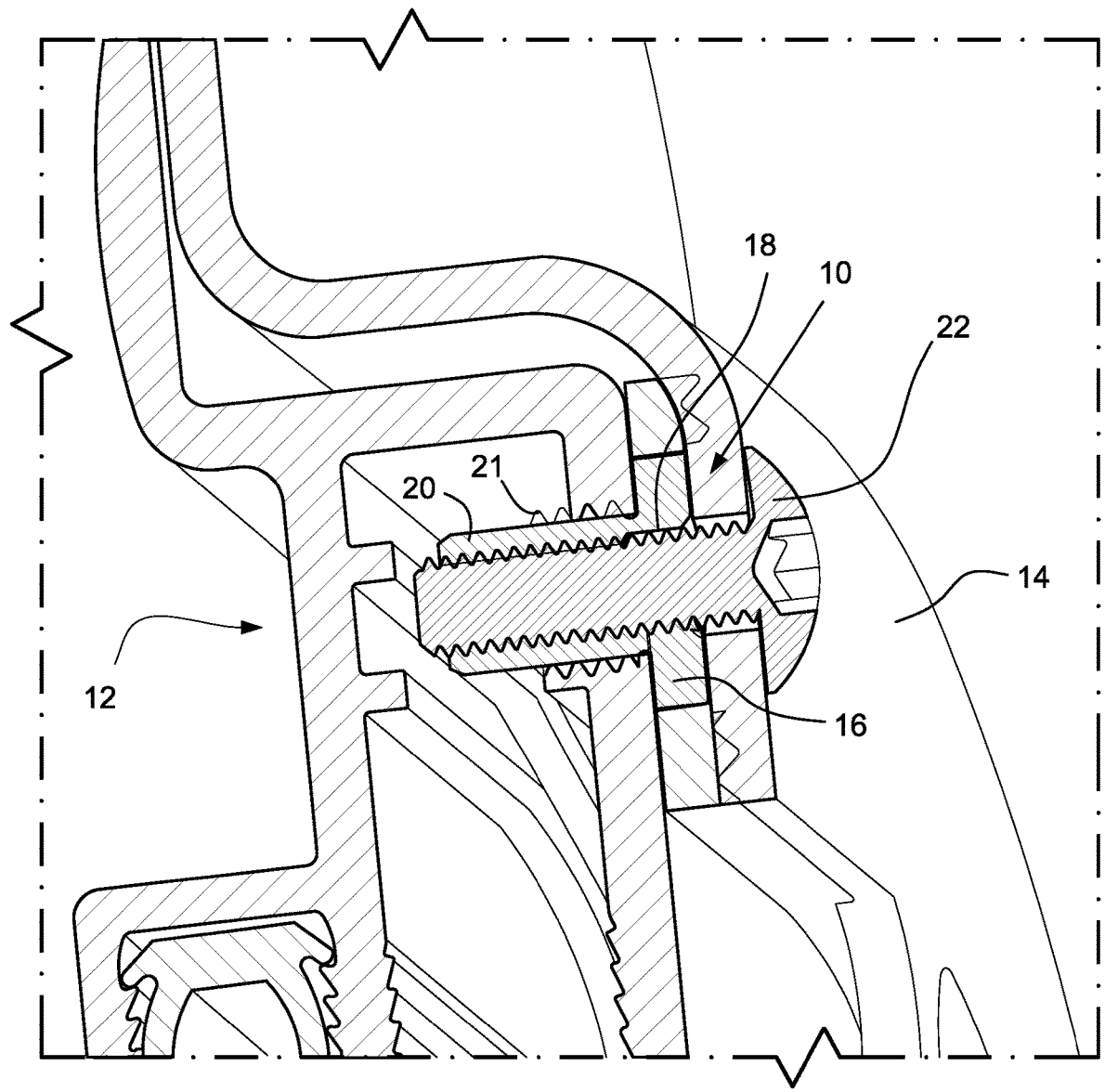
FIG. 1 shows a spacer insert secured between a cab frame and a window or door system.
Figure 2:
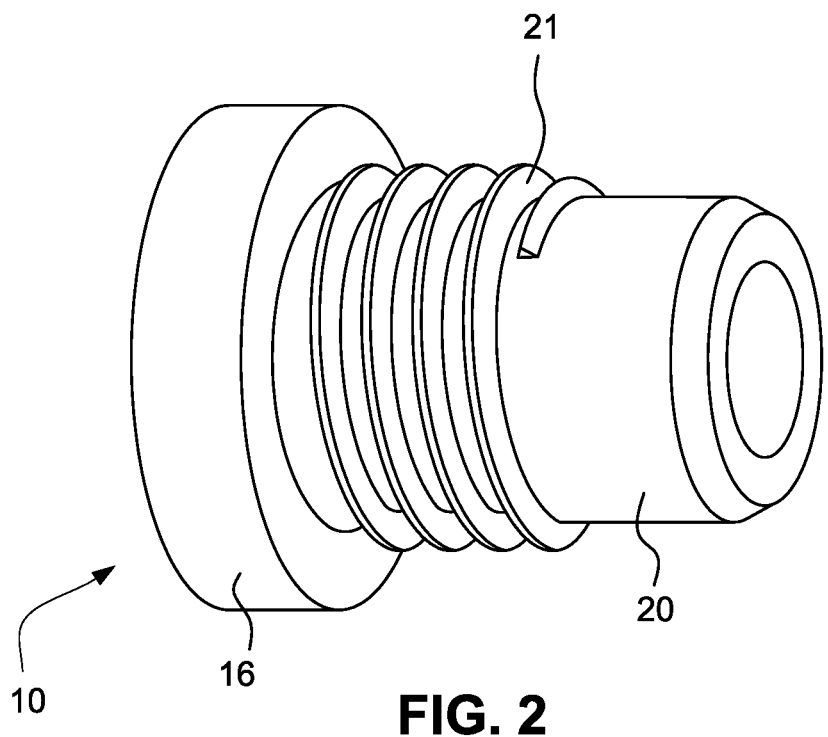
FIG. 2 is a perspective view of the spacer insert.

With reference to FIG. 1, a spacer insert 10 is shown secured between a first structure 12 such as a window or door system and a second structure 14 such as a cab frame. The spacer insert 10 includes a head 16 with a hex recess 18 or the like, and a hollow cylindrical shaft 20 coupled with and extending from the head 16. The hex recess 18 may be sized to fit a standard 6 mm hex drive socket. The hollow cylindrical shaft 20 defines at least part of a connector channel 19 (see FIG. 3). A thread 21 is provided on an exterior of the hollow cylindrical shaft 20. The hex recess 18 could alternatively be formed into any suitable shape. The recess 18 is continuous with and forms part of the connector channel 19.

Figure 3:
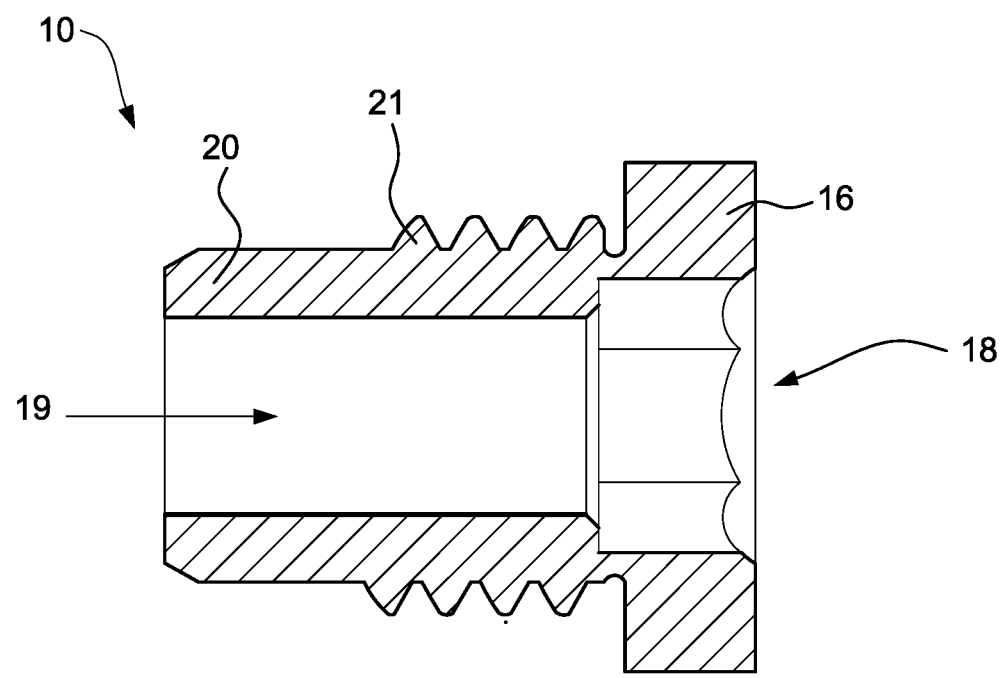
FIG. 3 is a sectional view of the spacer insert.

In some embodiments, the thread 21 extends to about a mid-portion of the hollow cylindrical shaft 20. The spacer insert 10 may be 15 mm long from the head 16 to a distal end, and the thread 21 may extend to a position 7 mm from the head 16. As shown in FIG. 3, the thread 21 may start at a position spaced from the head 16 by an undercut, which may be about 0.75 mm. Preferably, the spacer insert 10 is formed of steel although other materials may be suitable.

A thread locker such as Loctite® may be applied on the external thread 21.

The connector channel 19 through the hollow cylindrical shaft 20 is sized to receive a connector 22. In use, openings are formed in the first structure 12 that are sized to receive the hollow cylindrical shaft 20 and the exterior thread 21. The spacer inserts 10 are secured in the openings by being threaded into the openings. Corresponding openings in the second structure 14 are formed at locations matching the openings in the first structure 12. The openings in the second structure 14 are aligned with the spacer inserts 10 positioned in the openings of the first structure 12. Subsequently, the connector 22 is inserted (e.g., threaded) through each of the openings in the second structure 14 and into the spacer inserts 10. As shown in FIG. 1, as assembled, the heads 16 of the spacer inserts 10 are interposed between the second structure 14 and the first structure 12 to define a space between the second structure and the first structure.

The spacer inserts provide a better thread engagement for the installer to mount a screw around the perimeter, instead of relying on the frame material, which is typically aluminum. The spacer insert is easily inserted with standard tooling and can be accurately torqued. The insert is more economical to install than existing products and is more reliable in service.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A spacer insert for providing spacing between a first structure and a second structure, the spacer insert comprising:
   a head having a diameter larger than an opening in the first structure to which the spacer insert is attachable;
   a hollow cylindrical shaft coupled with and extending from the head, the hollow cylindrical shaft defining at least part of a connector channel; and
   a thread on an exterior of the hollow cylindrical shaft,
   wherein the hollow cylindrical shaft is configured to receive and secure a connector in the connector channel that connects the first structure to the second structure.

2. A spacer insert according to claim 1, wherein the thread extends to about a mid-portion of the hollow cylindrical shaft.

3. A spacer insert according to claim 2, wherein the spacer insert is 15 mm long, and wherein the thread extends to a position 7 mm from the head.

4. A spacer insert according to claim 1, wherein the thread is spaced from the head by an undercut.

5. A spacer insert according to claim 4, wherein the undercut is about 0.75 mm.

6. A spacer insert according to claim 1, further comprising a thread locker on the thread.

7. A spacer insert for providing spacing between a first structure and a second structure, the spacer insert comprising:
   a head having a diameter larger than an opening in the first structure to which the spacer insert is attachable;
   a hollow cylindrical shaft coupled with and extending from the head, the hollow cylindrical shaft defining at least part of a connector channel; and
   a thread on an exterior of the hollow cylindrical shaft,
   wherein the head comprises an exteriorly accessible shaped recess that is continuous with and forming part of the connector channel.

8. A spacer insert according to claim 7, wherein the shaped recess comprises a hex recess.

9. A spacer insert for providing spacing between a first structure and a second structure, the spacer insert comprising:
   a head having a diameter larger than an opening in the first structure to which the spacer insert is attachable;
   a hollow cylindrical shaft coupled with and extending from the head, the hollow cylindrical shaft defining at least part of a connector channel; and
   a thread on an exterior of the hollow cylindrical shaft,
   wherein the hollow cylindrical shaft is configured to be independently secured in the second structure.

* * * * *